US008285718B1

(12) United States Patent
Ong et al.

(10) Patent No.: US 8,285,718 B1
(45) Date of Patent: Oct. 9, 2012

(54) CLUSTERING MULTIMEDIA SEARCH

(75) Inventors: Edwin Seng Eng Ong, San Francisco, CA (US); Aleksandra R. Vikati, San Francisco, CA (US); Michael L. Harville, Palo Alto, CA (US); Kyle C. Maxwell, San Francisco, CA (US); Andrew S. Cantino, San Francisco, CA (US)

(73) Assignee: CastTV Inc., San Francisco, CA (US)

( * ) Notice: Subject to any disclaimer, the term of this patent is extended or adjusted under 35 U.S.C. 154(b) by 543 days.

(21) Appl. No.: 12/317,253

(22) Filed: Dec. 19, 2008

Related U.S. Application Data

(60) Provisional application No. 61/008,678, filed on Dec. 21, 2007.

(51) Int. Cl.
*G06F 17/30* (2006.01)

(52) U.S. Cl. ........ 707/737; 707/747; 707/758; 709/217; 709/245; 717/127; 717/131; 717/154

(58) Field of Classification Search .................. 707/737, 707/747, 999.004, 758, E17.019, E17.02, 707/E17.036, E17.046, 999.107; 709/217, 709/219, 245; 717/127, 131, 154
See application file for complete search history.

(56) References Cited

U.S. PATENT DOCUMENTS

| | | | |
|---|---|---|---|
| 6,374,266 B1 * | 4/2002 | Shnelvar | 1/1 |
| 7,373,520 B1 * | 5/2008 | Borthakur et al. | 713/189 |
| 7,376,752 B1 * | 5/2008 | Chudnovsky et al. | 709/245 |
| 7,681,032 B2 * | 3/2010 | Peled et al. | 713/154 |
| 2002/0038299 A1 * | 3/2002 | Zernik et al. | 707/3 |
| 2002/0056041 A1 * | 5/2002 | Moskowitz | 713/176 |
| 2004/0140915 A1 * | 7/2004 | Shen et al. | 341/50 |
| 2004/0220975 A1 * | 11/2004 | Carpentier et al. | 707/200 |
| 2007/0078846 A1 * | 4/2007 | Gulli et al. | 707/5 |
| 2007/0083513 A1 * | 4/2007 | Cohen et al. | 707/6 |
| 2007/0085710 A1 * | 4/2007 | Bousquet et al. | 341/50 |

\* cited by examiner

*Primary Examiner* — John E Breene
*Assistant Examiner* — Andalib Lodhi
(74) *Attorney, Agent, or Firm* — Van Pelt, Yi & James LLP

(57) ABSTRACT

A method for clustering a set of web search results is disclosed. A first signature is compared based at least in part on an analysis of multimedia content associated with a first web search result with a second signature based at least in part on an analysis of multimedia content associated with a second web search result. The first web search result is clustered with the second web search result based at least in part on the comparison of the first signature with the second signature.

23 Claims, 8 Drawing Sheets

US 8,285,718 B1

CLUSTERING MULTIMEDIA SEARCH

CROSS REFERENCE TO OTHER APPLICATIONS

This application claims priority to U.S. Provisional Patent Application No. 61/008,678 entitled CLUSTERING MULTIMEDIA SEARCH filed Dec. 21, 2007 which is incorporated herein by reference for all purposes.

BACKGROUND OF THE INVENTION

There is an increasingly large volume of image, video, audio, and other multimedia content being posted to the Internet and the World Wide Web ("web"). With increased volumes of text and multimedia content, a user must rely more on search engines to find particular content.

Many existing search engines were designed primarily for text content, and when a user searches for multimedia content using these search engines often the relatedness of search results associated with similar multimedia content is not recognized or made apparent.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Clustering search results based on similarity of multimedia content, determined based at least in part on an non-text-based analysis or representation of such content, is disclosed. In some embodiments, for each of a plurality of actual or potential search results, e.g., web pages, having associated multimedia content, a representation of the multimedia content is generated and the respective representations used, in advance of query/search time or in real time, to determine a degree of similarity between the respective multimedia content associated with the respective results (e.g., pages). The degree of similarity information is used to cluster search results, for example by presenting or otherwise associating together as a responsive cluster of results two or more responsive pages (or other results) that have been determined to the same and/or very similar multimedia content.

Figure 1:
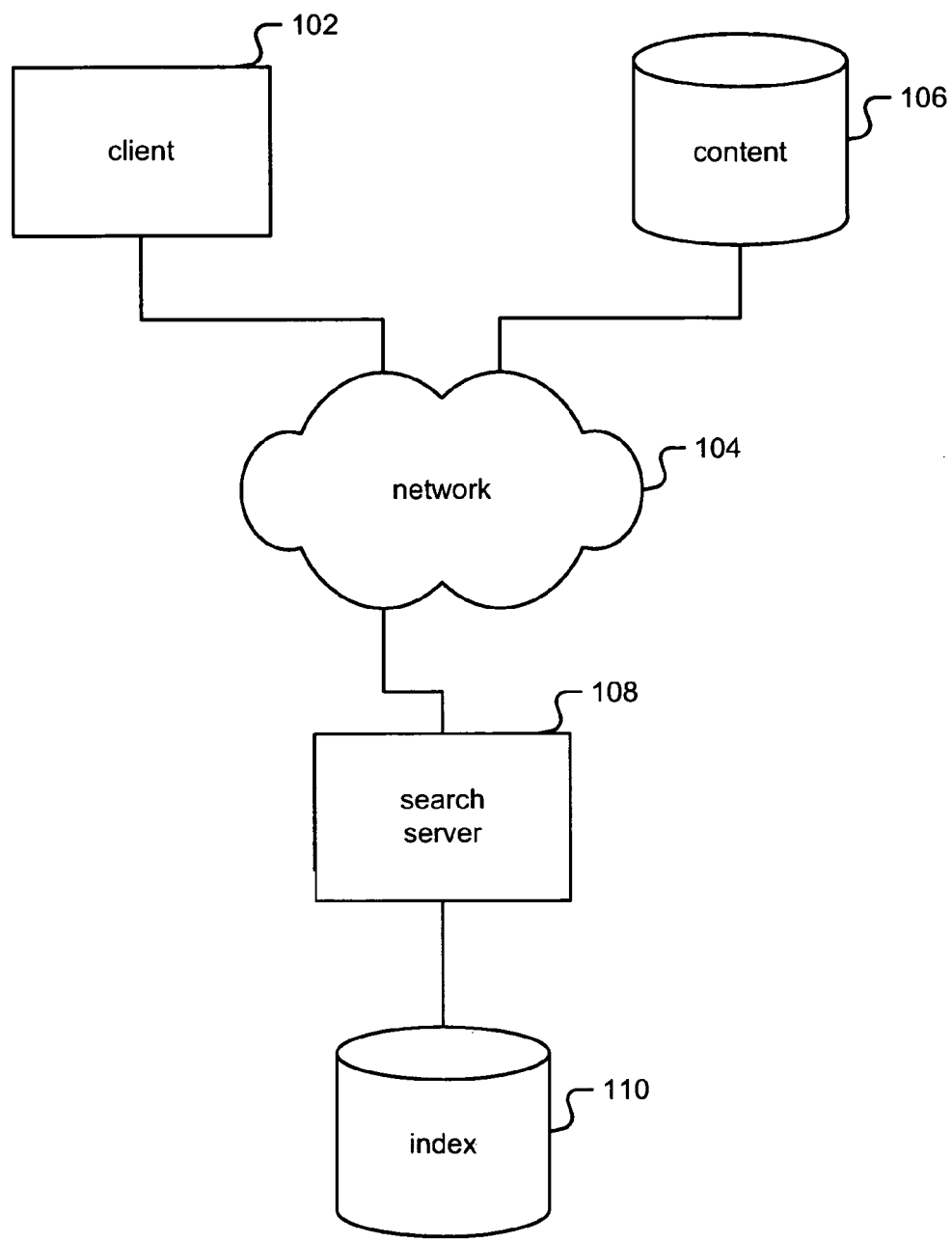
FIG. 1 is a block diagram illustrating an embodiment of a system for clustering a set web search results.

FIG. 1 is a block diagram illustrating an embodiment of a system for clustering a set web search results. In the example shown, client 102 is connected through network 104 to content 106. Client 102 may represent a user, a web browser, or another search engine licensed to use the clustering system. Network 104 may be a public or private network and/or combination thereof, for example the Internet, an Ethernet, serial/parallel bus, intranet, Local Area Network ("LAN"), Wide Area Network ("WAN"), and other forms of connecting multiple systems and/or groups of systems together. Content 106 may include text content, graphical content, audio content, video content, web based content and/or database content.

Network 104 is also connected to a search server 108, which is connected to index 110. Search server 108 may be configured to search and cluster content 106 for client 102. Search server 108 may be comprised of one or more servers. Index 110 may include a database and/or cache.

Figure 2:
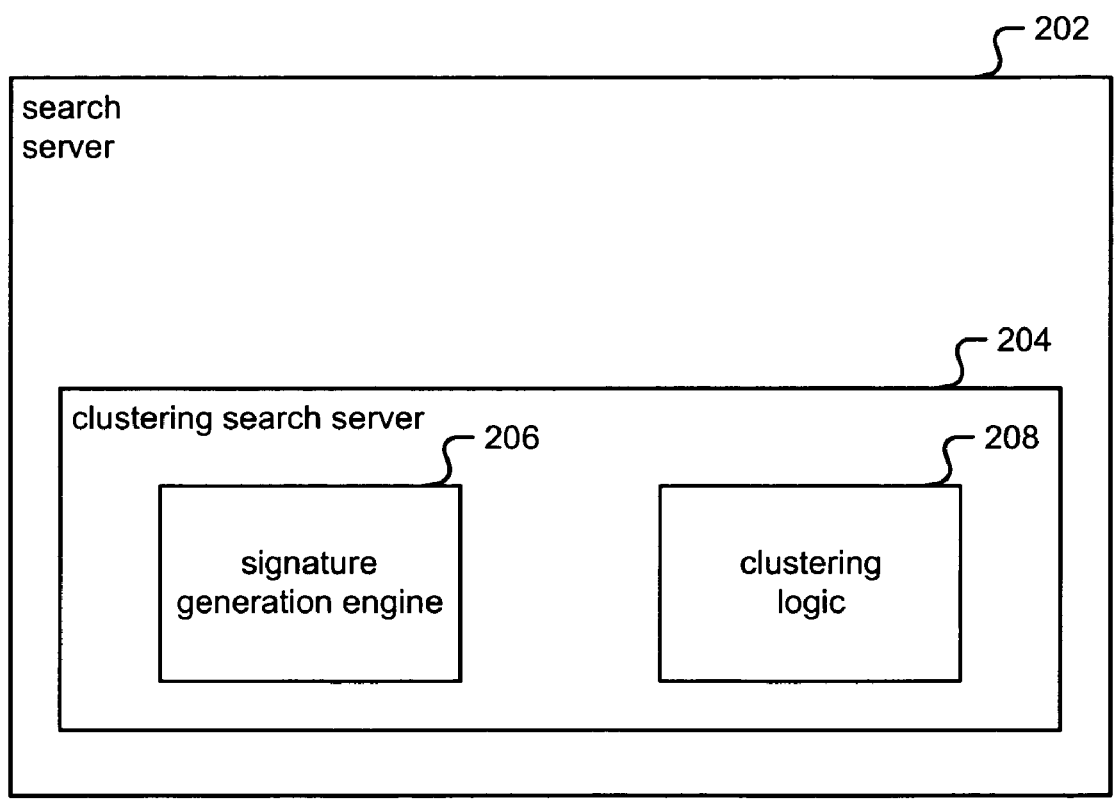
FIG. 2 illustrates an embodiment of a search server for clustering multimedia search.

FIG. 2 illustrates an embodiment of a search server for clustering multimedia search. In some embodiments, the search server in FIG. 2 is included as search server 108 in FIG. 1. In the example shown, search server 202 includes a plurality of servers, including clustering search server 204. Clustering search server 204 includes a plurality of functional engines, including an optional signature generation engine 206 and clustering logic 208.

Signature generation engine 206 generates a signature representative of at least a portion of the multimedia content of a multimedia content item, such as an image or an audio and/or video clip, associated with a web page (or other actual or potential search result). A signature in some embodiments comprises a representation of at least a portion of the multimedia content of a multimedia content item.

In various embodiments, the signature is generated based at least in part on portions of multimedia content believed to be characteristic of and/or distinctive to the multimedia content being represented, such that there is a likelihood that another multimedia content item having the same or a very similar signature comprises multimedia content that is at least in part the same or nearly the same as corresponding content comprising the multimedia content item that the signature is generated to represent. Simple examples of a signature for illustrative purposes include without limitation the average RGB or grayscale value of each quadrant of an image, the percentage of laughter in an audio track, or the number of scene transitions in a video.

Signature generation engine 206 may include one or more hardware elements and/or software elements. Examples of such hardware elements include: servers, embedded systems, printed circuit boards ("PCBs"), processors, application specific integrated circuits ("ASICs"), field programmable gate arrays ("FPGAs"), and programmable logic devices ("PLDs"), and software elements could include: modules, models, objects, libraries, procedures, functions, applications, applets, weblets, widgets and instructions.

Clustering logic 208 groups web search results associated with multimedia content items that have been determined to have the same or similar multimedia content, at least in part, based on a comparison of the respective signatures generated for each result by signature generation engine 206.

In some embodiments clustering is based at least in part on the entropy of the signatures of the multimedia content items. For example, a signature determined to have a high level of entropy, and therefore presumably embodies more information, in some embodiments is given more weight than a signature having low entropy. The foregoing approach is based on the expectation that all else being equal if two multimedia content items have low entropy signatures having the same degree of similarity as the respective signatures of a second set of content items having high entropy signatures, the second set of content items are more likely to in fact have the same or very similar multimedia than the latter two. Stated another, if a signature is low entropy it is less likely to represent uniquely a particular multimedia content and other content that is not that similar to the first content may have a sufficiently similar signature to generate a false match.

Clustering logic 208 may include one or more hardware elements and/or software elements. Examples of such hardware elements include: servers, embedded systems, printed circuit boards ("PCBs"), processors, application specific integrated circuits ("ASICs"), field programmable gate arrays ("FPGAs"), and programmable logic devices ("PLDs"), and software elements could include: modules, models, objects, libraries, procedures, functions, applications, applets, weblets, widgets and instructions.

Figure 3:
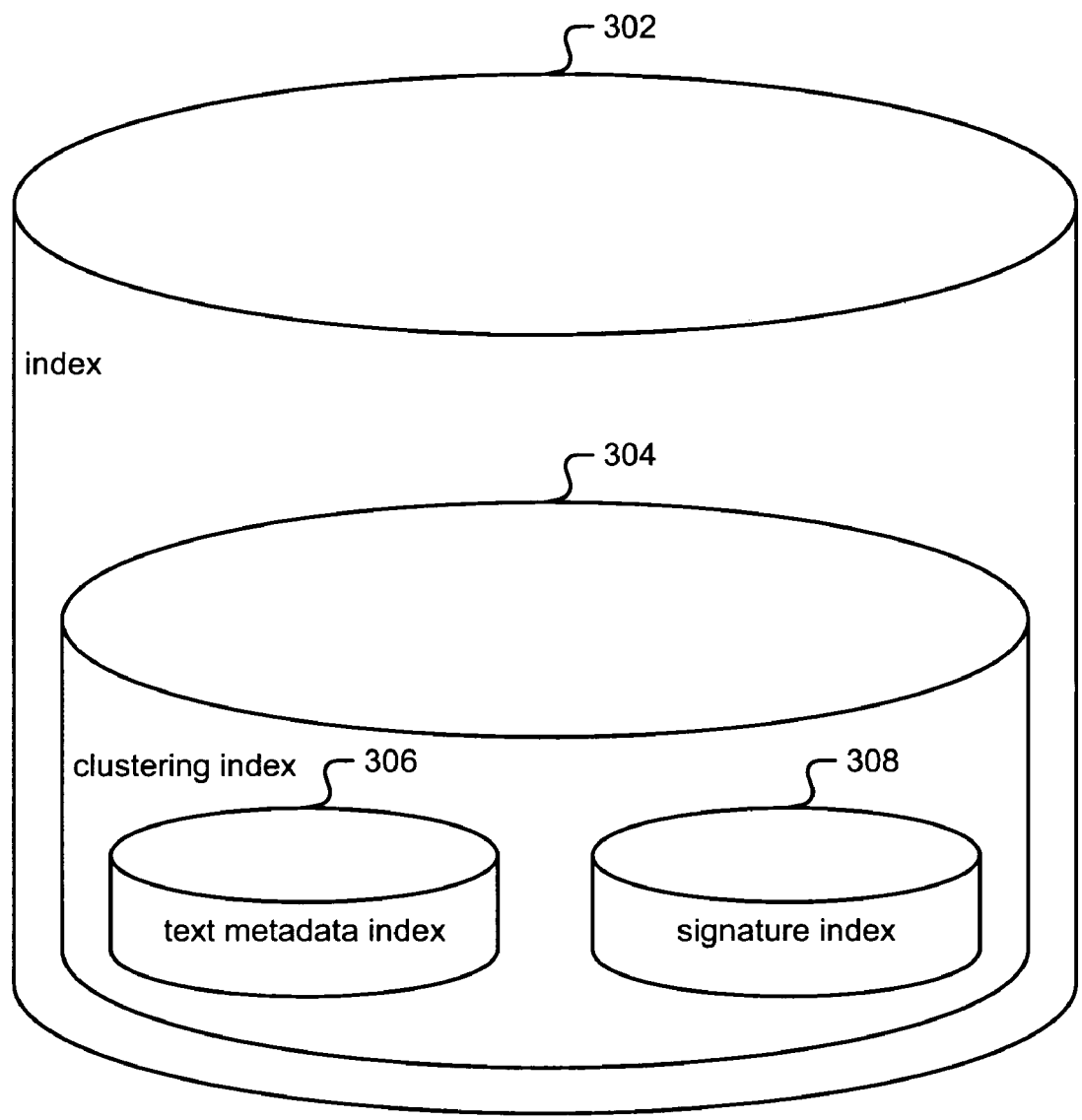
FIG. 3 illustrates an embodiment of an index for clustering multimedia search.

FIG. 3 illustrates an embodiment of an index for clustering multimedia search. In some embodiments, the index in FIG. 3 is included as index 110 in FIG. 1. In the example shown, index 302 includes a plurality of indices, including clustering index 304. Clustering index 304 includes a plurality of indices, including a text metadata index 306 and signature index 308.

Text metadata index 306 references content 106 by metadata given for each content item. For example, a video clip may have as its metadata the producer's name, its run length and the title of the clip. In this example, the video clip would be represented in text metadata index 306 by storing its address and associated metadata. The video clip address may include its file location, its library reference number, its Uniform Resource Locator ("URL"), or its Uniform Resource Identifier ("URI"). The associated metadata may include the metadata field descriptions, for example "producer's name", "run-length", and "title", as well as field content, for example "Joe Producer", "1:45:34" and "Drama Squirrels: The Sequel".

Signature index 308 references content 106 by the signature generated by signature generation engine 206. In the above example, the video clip would be represented in signature index 308 by storing its address and associated signature.

Figure 4:
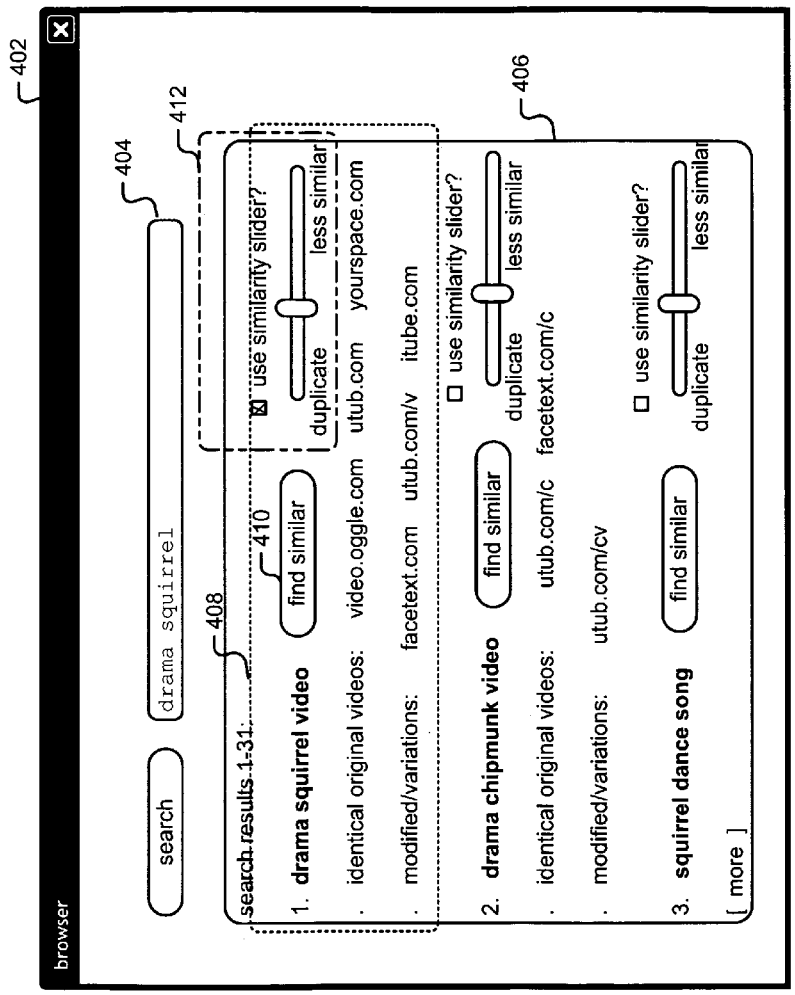
FIG. 4 is a diagram illustrating an embodiment of a display page configured for clustering a set of multimedia search results.

FIG. 4 is a diagram illustrating an embodiment of a display page configured for clustering a set of multimedia search results. Display page 402 shows the layout of the page as rendered by a browser at, for example, client 102.

Display page 402 includes a search frame 404, which includes both a field for client 102 to enter in search parameters and an active element to initiate the search, such as a search button. In the example given in FIG. 4, the client 102 is searching for a "drama squirrel" multimedia content item.

Clustered multimedia search results are given in results frame 406, which in the example given in FIG. 4, shows thirty-one distinct results. Search results may be given in a ranked order, as is the case in FIG. 4. In results frame 406 the first result 408 is given for a "drama squirrel video" content item, and the clustering shows:

there are three identical videos located at addresses "video.oggle.com", "utub.com" and "yourspace.com", and there are three variations of the "drama squirrel video" content item at addresses "facetext.com", "utub.com/v" and "itube.com".

In the example, the results frame 406 also shows a second result with less ranking as a "drama chipmunk video" content item, and a third result with less ranking as a "squirrel dance song" content item. In some embodiments, within a result there may be two additional implementations:

First, a "find similar" button 410 that will find similar results to any given result, without considering any metadata. In the example shown, there are 31 results for the "drama squirrel" search. Clicking "find similar" on the first result, will cause similar or duplicate results that may not necessarily have "drama squirrel" in its metadata.

In some embodiments a "find similar" button will cause a search based either only on the signature of the current result in comparison with other known signatures, or on the signature of the current result in comparison with other known signatures and metadata fields implicit to the current result.

Second, a "similarity slider" 412 that allows the exploration of a spectrum from 'duplicate' to 'more similar' to 'less similar.' In some embodiments, if the slider is placed on 'duplicate' for a "drama squirrel" search, only exact duplicates are found. As the slider is set from "duplicate" towards "less similar results" results become increasingly non-duplicated but still related.

For example, a search is made for a "Debra Hilton" video. A grocery shopping video with Debra Hilton is the result 408. There are four possible options by setting slider 412:

With the slider 412 on duplicate: Only exact matches are made to the current result, the Debra Hilton grocery shopping video;

With the slider 412 on more similar: Similar matches of thumbnails of the Debra Hilton grocery shopping video, including videos with possibly different shots or angles, are made;

With the slider 412 on similar: Similar matches of videos with Debra Hilton in comparable poses as to that in the Debra Hilton grocery shopping video, are made; and With the slider 412 on less similar: Similar matches of videos with people who look like Debra Hilton as in the Debra Hilton grocery shopping video, are made.

Figure 5:
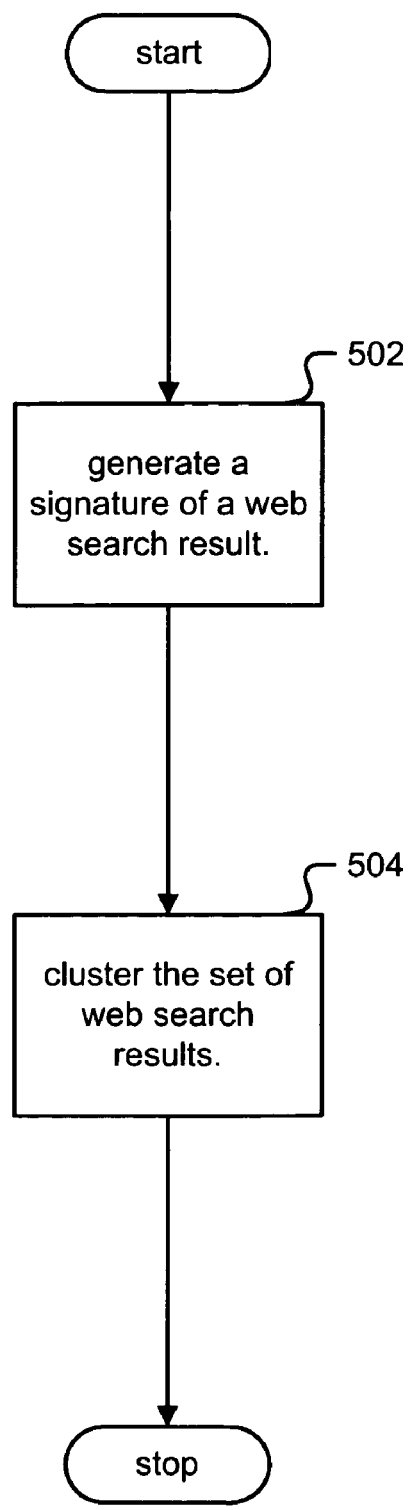
FIG. 5 is a flowchart illustrating an embodiment of a process for clustering a set of multimedia search results.

FIG. 5 is a flowchart illustrating an embodiment of a process for clustering a set of multimedia search results. The process may be implemented in search server 108.

In step 502, a signature of a search result is generated, based at least in part on an analysis of multimedia content associated with the web search result. In some embodiments this step is implemented by signature generation engine 206. Multimedia includes any content that is not purely text, such as images, video and audio. In some embodiments, a characteristic of the signature is that a distance metric may be calculated between a first and second signature. In some embodiments, the signature is a vector and the distance metric is a scalar. The distance metric may include one or more and/or a weighted or other combination of one or more of:
- a Cartesian or Euclidean distance;
- a Manhattan or rectilinear distance; and
- a byte-wise difference between one or more of the bytes within the signature.

The signature may include a hash value based at least in part on features of the image, audio, video or other multimedia type. In an image or video, the signature may include one or more of:
- a recognized face, for example "The President of the United States";
- a recognized logo, for example "The USPTO Logo";
- a recognized facial feature, for example "A brown mustache"; and
- recognizing a normalized feature, for example if all videos from a particular studio have a regular or normal form.

While particular types of signature and distance metrics are described above, in practice any relatively concise representation of the multimedia content of a content item such that another content item having the same or a very similar signature is likely to include the same or similar multimedia content and conversely content items having a relatively more dissimilar signature are unlikely to include the same or very similar multimedia content may be used.

In step 504, the set of web search results is clustered based at least in part on the signature of each web search result. In some embodiments, the signature of each web search result is compared to another web search result's signature by analyzing their distance metric.

In some embodiments, the signatures of content 106 are pre-computed before performing search. By pre-computing signatures, it is possible to find a multimedia content item that is similar to a web search result, for example, to:
- find a video clip that looks like a web search result;
- find a video clip that sounds like a web search result; and
- find an audio clip that sounds like a web search result.

Figure 6:
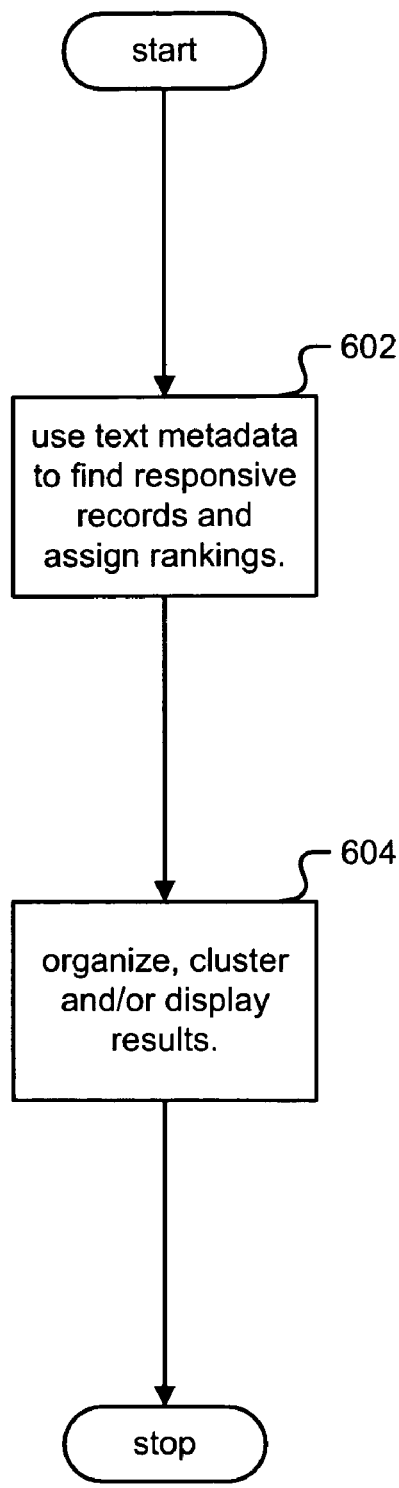
FIG. 6 is a flowchart illustrating an embodiment of a process for clustering search results.

FIG. 6 is a flowchart illustrating an embodiment of a process for clustering search results. In some embodiments, the process of FIG. 6 is included in 504 of FIG. 5. The process may be implemented in search server 108.

In step 602, the text metadata is used to find responsive records and optionally assign rankings. For example, a search for "drama squirrel" could use available text search techniques to find records with metadata that includes: "drama squirrel", "drama", "squirrel", "show squirrel", "drama chipmunk", and other permutations from parsing the query. In some embodiments, rankings may be assigned based on the relevance of the found records to the search query using available ranking techniques.

In step 604, with both the signatures and text metadata rankings, the results may be organized, clustered and/or displayed. In some embodiments the organization and clustering may be similar to the example for frame 406.

Figure 7:
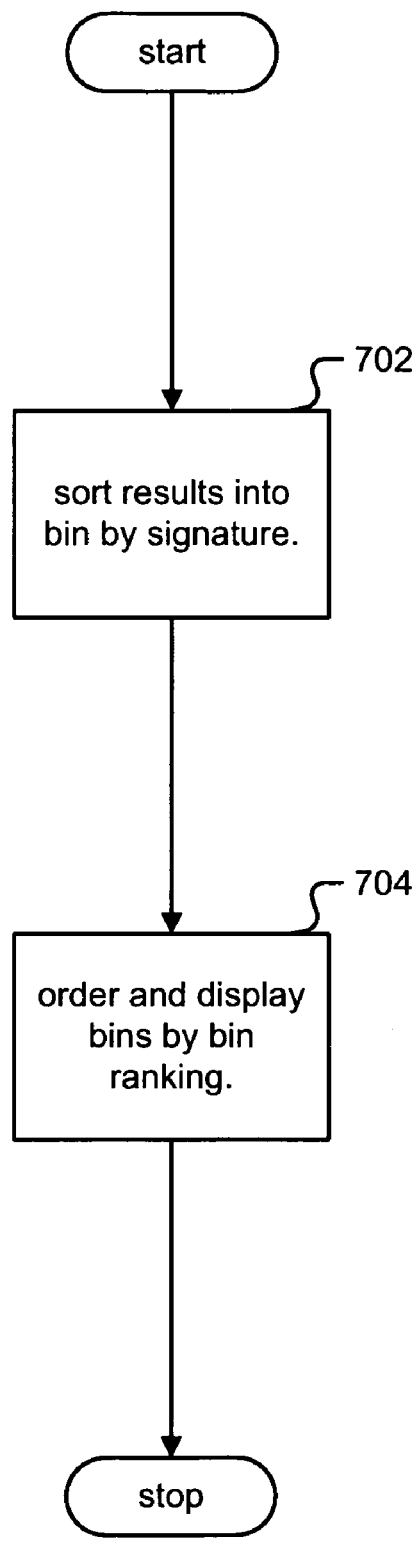
FIG. 7 is a flowchart illustrating an embodiment of a process for clustering search results given signatures and metadata.

FIG. 7 is a flowchart illustrating an embodiment of a process for clustering search results given signatures and metadata. In some embodiments, the process of FIG. 7 is included in 604 of FIG. 6. The process may be implemented in search server 108.

In step 702, the results from the text metadata search in step 602 are coupled with the signatures generated in step 502 and sorted into bins. For example, a search for "drama squirrel" may find the highest ranked result is a "drama squirrel video" content item available by network 104 that has several identical copies at different addresses, and several similar copies at other addresses. In this example all of these content items would be consolidated in a single bin.

In step 704, the bins would be ordered and displayed by its bin ranking. The bin ranking of a specified bin is related to the rank of each result within that specified bin. In some embodiments, the bin ranking would be directly related to the highest ranked result within each bin. In some embodiments, the bin ranking would be further weighted by the number or quality of results within a bin. In some embodiments, displaying a cluster includes labeling two web search results with similar video signatures and different audio signatures as commentary. In some embodiments, displaying a cluster includes labeling two web search results with similar audio signatures and different video signatures as remixes. In some embodiments, the number of cluster members in a bin can be used as a ranking factor, such that the result with the highest number of duplicates would be deemed more significant than a result with very few number of duplicates. For example, the most popular video of a contemporary singer Jane Smith would have a very high number of copies circulating on the web vs a homemade video of a Jane Smith cover.

Figure 8:
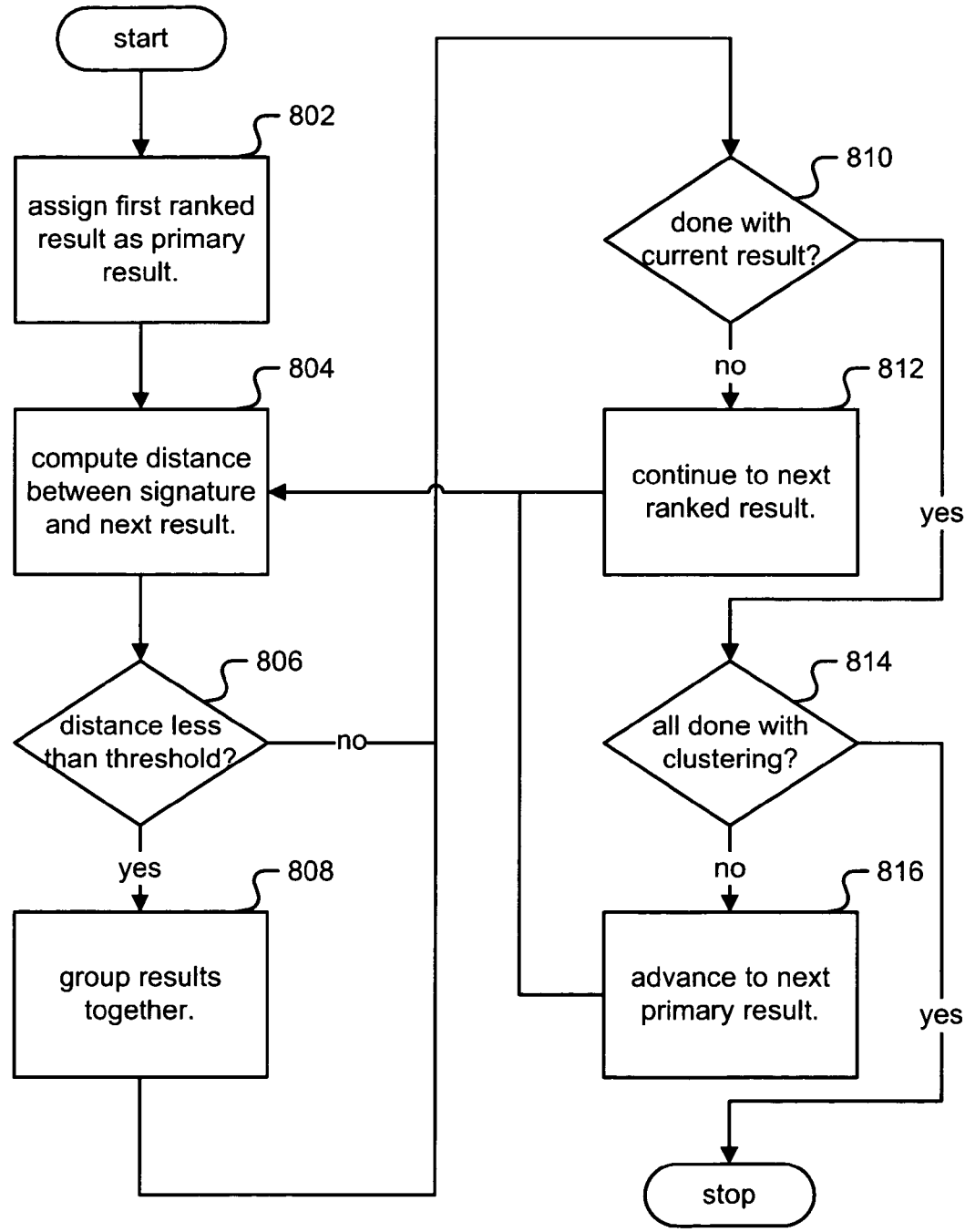
FIG. 8 is a flowchart illustrating an embodiment of a process for sorting results into bins.

FIG. 8 is a flowchart illustrating an embodiment of a process for sorting results into bins. In some embodiments, the process of FIG. 8 is included in 702 of FIG. 7. The process may be implemented in search server 108.

In step 802, a first ranked result is assigned as the primary result, with its signature generated from step 502. In step 804, the next result is compared by computing the distance between itself and the primary result. If it is determined in step 806 that the distance is less than a predetermined threshold, then control is transferred to step 808; otherwise, control is transferred to step 810. A distance less than the predetermined threshold may indicate that the two multimedia content items associated with the two results are related.

In step 808, two related results will be grouped together in a bin. In some embodiments, the predetermined threshold in step 806 indicates that the two results are either identical or similar, for example, a post-production modification. In some embodiments a second comparison will be made to see if the distance is less than a predetermined smaller threshold. A distance less than the predetermined smaller threshold may indicate that the two multimedia content items associated with the two results are nearly identical. Thus, within the bin, there may be at least two sub-bins; the first of "identical" content items to the primary result, and the second of "similar" content items to the primary result. In some embodiments there may be a recursive clustering within clustered results. In some embodiments, if a result is placed within a bin, it may be removed from being contained within another bin.

In step 810, if it is determined that there are no other results to compare with the primary result, then control is transferred to step 814; otherwise, control is transferred to step 812. In some embodiments, there may be no other results to compare because every result has already been compared with the primary result. In some embodiments, there may be no other results to compare because a predetermined amount of results have already been compared with the primary result. In step 812, the process repeats starting with step 804 but with a comparison comparing the primary result with the next ranked result.

In step 814, if it is determined that the clustering is complete, the process is ends; otherwise, control is transferred to step 816. In some embodiments, clustering is complete because every result has been placed in a bin. In some embodiments, clustering is complete based on a heuristic; for example the heuristic may determine to stop after thirty bins have been created.

In step 816, the next available result is assigned as the primary result. In some embodiments, the next available result is the next ranked result from the primary result. In some embodiments, the next available result is the next ranked result from the primary result not already in a bin.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for clustering a set of web search results, comprising:
    determining a first video signature based at least in part on an analysis of video content associated with a first web search result;
    determining a first audio signature based at least in part on an analysis of audio content associated with the first web search result;
    determining a second video signature based at least in part on an analysis of video content associated with a second web search result;
    determining a second audio signature based at least in part on an analysis of audio content associated with the second web search result;
    comparing the first video signature, the first audio signature, the second video signature, and the second audio signature;
    using a processor to cluster the first web search result with the second web search result based at least in part on the comparison; and
    labeling the two web search results in the event that:
    1) the first and second video signatures are similar and the first and second audio signatures are different or
    2) the first and second audio signatures are similar and the first and second video signatures are different.

2. A method as recited in claim 1, further comprising generating a signature.

3. A method as recited in claim 1, further comprising reducing the set of web search results based at least in part on an analysis of textual metadata.

4. A method as recited in claim 1, wherein video content is any non-textual data or metadata.

5. A method as recited in claim 1, wherein video content includes images, video and audio.

6. A method as recited in claim 1, wherein each signature has a distance metric between a second signature.

7. A method as recited in claim 6, wherein the distance metric includes one or a weighted combination of: a Cartesian distance; a Manhattan distance; a Euclidean distance; and a byte difference.

8. A method as recited in claim 6, wherein clustering includes consolidating web search results with the distance metric below an identical-threshold.

9. A method as recited in claim 6, wherein clustering includes highlighting web search results with the distance metric below a similar-threshold but above an identical-threshold.

10. A method as recited in claim 1, wherein each video signature includes a hash value based at least in part on image features.

11. A method as recited in claim 1, wherein each audio signature includes a hash value based at least in part on audio features.

12. A method as recited in claim 1, wherein each video signature includes a hash value based at least in part on video features.

13. A method as recited in claim 1, wherein each video signature includes a recognized face.

14. A method as recited in claim 1, wherein each video signature includes a recognized logo.

15. A method as recited in claim 1, wherein each video signature includes a recognized facial feature.

16. A method as recited in claim 1, wherein clustering labeling includes labeling two web search results with similar video signatures and different audio signatures as commentary.

17. A method as recited in claim 1, wherein labeling includes labeling two web search results with similar audio signatures and different video signatures as remixes.

18. A method as recited in claim 1, further comprising precomputing signatures before forming the set of web search results.

19. A method as recited in claim 18, further comprising finding video that sounds like a web search result.

20. A method as recited in claim 18, further comprising finding video that looks like a web search result.

21. A method as recited in claim 18, further comprising finding audio that sounds like a web search result.

22. A system for clustering a set of web search results, comprising:
    a data store configured to store signatures of web search results; and
    a processor coupled to the data store and configured to:
    determine a first video signature based at least in part on an analysis of video content associated with a first web search result;
    determine a first audio signature based at least in part on an analysis of audio content associated with the first web search result;
    determine a second video signature based at least in part on an analysis of video content associated with a second web search result;
    determine a second audio signature based at least in part on an analysis of audio content associated with the second web search result;
    compare the first video signature, the first audio signature, the second video signature, and the second audio signature;
    cluster the first web search result with the second web search result based at least in part on the comparison; and
    label the two web search results in the event that:
    1) the first and second video signatures are similar and the first and second audio signatures are different; or
    2) the first and second audio signatures are similar and the first and second video signatures are different.

23. A computer program product for clustering a set of web search results, the computer program product being embod ied in a non-transitory computer readable medium and comprising computer instructions for:

determining a first video signature based at least in part on an analysis of video content associated with a first web search result;

determining a first audio signature based at least in part on an analysis of audio content associated with the first web search result;

determining a second video signature based at least in part on an analysis of video content associated with a second web search result;

determining a second audio signature based at least in part on an analysis of audio content associated with the second web search result;

comparing the first video signature, the first audio signature, the second video signature, and the second audio signature;

clustering the first web search result with the second web search result based at least in part on the comparison; and labeling the two web search results in the event that:

1) the first and second video signatures are similar and the first and second audio signatures are different; or 2) the first and second audio signatures are similar and the first and second video signatures are different.

* * * * *

UNITED STATES PATENT AND TRADEMARK OFFICE
CERTIFICATE OF CORRECTION

PATENT NO. : 8,285,718 B1
APPLICATION NO. : 12/317253
DATED : October 9, 2012
INVENTOR(S) : Ong et al.

It is certified that error appears in the above-identified patent and that said Letters Patent is hereby corrected as shown below:

In the claims

In Column 8, Line 21, Claim 16, after "wherein" delete "clustering labeling" and insert --labeling--, therefor.

Signed and Sealed this
Fourteenth Day of June, 2016

Michelle K. Lee
*Director of the United States Patent and Trademark Office*